US008550524B2

(12) United States Patent
Yeh et al.

(10) Patent No.: US 8,550,524 B2
(45) Date of Patent: Oct. 8, 2013

(54) PICK-UP DEVICE

(75) Inventors: Chin-Wen Yeh, New Taipei (TW); Yang Xiao, Wuhan (CN); Kai Pei, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/414,788

(22) Filed: Mar. 8, 2012

(65) Prior Publication Data

US 2012/0326458 A1 Dec. 27, 2012

(30) Foreign Application Priority Data

Jun. 22, 2001 (CN) ............................ 201110169418

(51) Int. Cl.
*A47J 45/00* (2006.01)

(52) U.S. Cl.
USPC .......................................... 294/183; 294/64.2

(58) Field of Classification Search
USPC ................................ 294/64.2, 183, 187, 189
See application file for complete search history.

(56) References Cited

U.S. PATENT DOCUMENTS

| | | | | |
|---|---|---|---|---|
| 4,796,357 | A * | 1/1989 | Smith | 29/840 |
| 4,950,011 | A * | 8/1990 | Borcea et al. | 294/2 |
| 6,240,628 | B1 * | 6/2001 | Yoshida et al. | 29/740 |
| 7,222,901 | B2 * | 5/2007 | Gebauer et al. | 294/183 |
| 8,262,146 | B2 * | 9/2012 | Stoppel | 294/183 |
| 2002/0185875 | A1 * | 12/2002 | Kim | 294/64.1 |

* cited by examiner

*Primary Examiner* — Stephen Vu
(74) *Attorney, Agent, or Firm* — Altis Law Group, Inc.

(57) ABSTRACT

A pick-up device includes an sucking member, a blocking member, a grasping assembly, a restricting member and a covering member. The sucking member is adapted to utilize a vacuum to adhere to the surface of an electronic component and defines a through hole. The blocking member is secured to the sucking member and includes a blocking block. The finger-grasping assembly is slidably mounted to blocking member. The restricting member is movably mounted to the grasping assembly and movable relative to the sucking member. The restricting member includes two restricting portions. The covering member is secured to the restricting member by a first resilient member. The grasping assembly is operable to bias the restricting member and the covering member to move relative to the sucking member, the two restricting portions are engaged with the blocking block, and the covering member seals the through hole.

20 Claims, 9 Drawing Sheets

PICK-UP DEVICE

BACKGROUND

1. Technical Field

The present disclosure relates to pick-up devices, and particularly to a pick-up device employing a vacuum to lift electronic devices.

2. Description of Related Art

A plurality of components are secured to a motherboard of an electronic device such as a computer. A Central Processing Unit (CPU) is secured to the motherboard by an installing tool after the plurality of components is secured. The installing tool may include a hand-held arm and a suction cup. The arm and the suction cup are secured together with a screw. The CPU is sucked by the suction cup and placed in a very particular position of the motherboard by moving the arm. The CPU is prone to sliding or otherwise changing its relative position when it is picked up, causing imprecise or incorrect installation on the motherboard. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
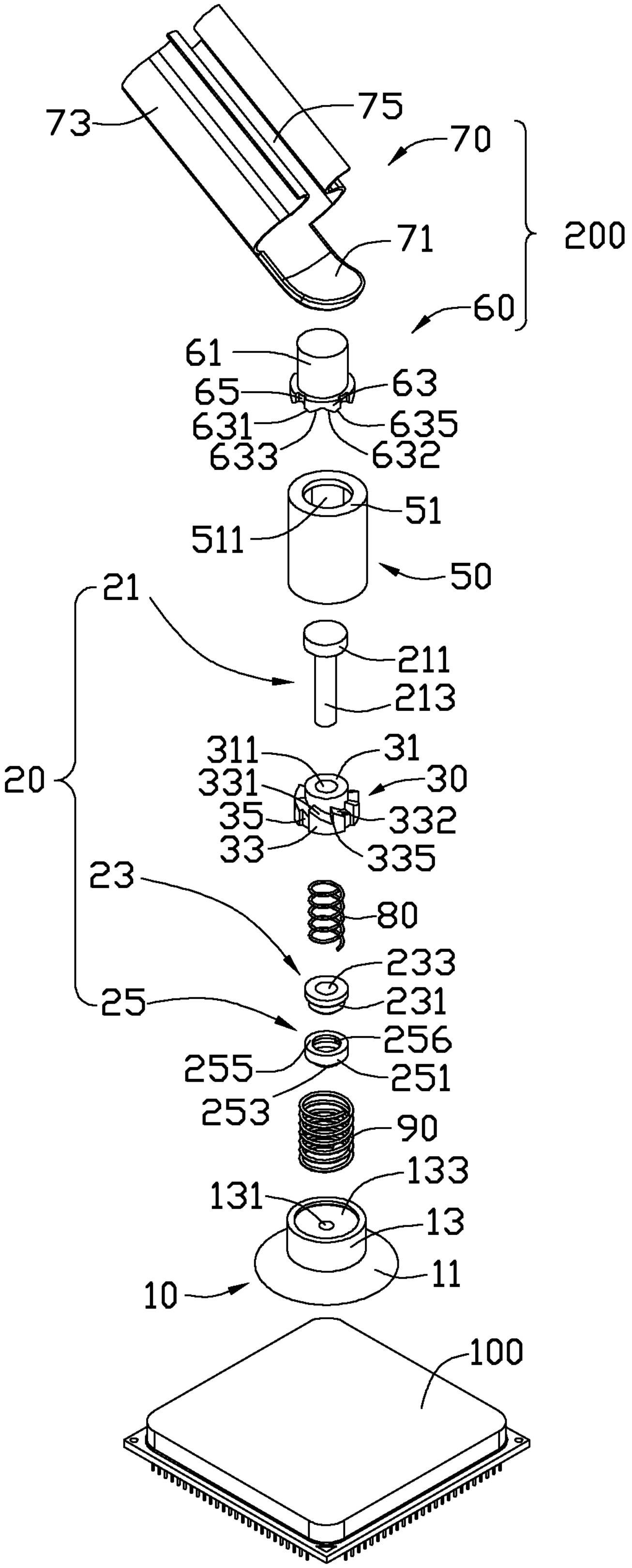
FIG. 1 is an exploded, isometric view of one embodiment of a pick-up device and a component.

Referring to FIG. 1, a pick-up device employs a vacuum to lift a component 100. The pick-up device in accordance with an embodiment includes a sucking member 10, a covering assembly 20, a restricting member 30, a blocking member 50 and a grasping assembly 200. In one embodiment, the component 100 is a CPU.

The sucking member 10 includes a suction cup 11 and a mounting portion 13 connected to the suction cup 11. The mounting portion 13 defines a through hole 131 and includes a recess portion 133. In one embodiment, the mounting portion 13 is cylindrical.

The covering assembly 20 includes an installing member 21, a locking member 23 and a covering member 25. The installing member 21 includes a head portion 211 and a threaded portion 213 connected to the head portion 211. In one embodiment, a cross-section of the head portion 211 and the threaded portion 213 are round, and a diameter of the head portion 211 is larger than that of the threaded portion 213. The locking member 23 defines a latching slot 231 and a threaded hole 233. The covering member 25 includes an installing portion 251 and a covering portion 253, connected to the installing portion 251. The covering portion 253 is the surface which is closest to the component 100, and that surface is convex. The installing portion 251 includes a positioning piece 255 and defines a positioning hole 256. The positioning hole 256 extends to the covering portion 253. The covering member 25 is elastically deformable. In one embodiment, the covering member 25 is made of rubber.

The restricting member 30 includes a receiving portion 31 and a plurality of restricting portions 33. The plurality of restricting portions 33 is located on an outer surface of the receiving portion 31. Each adjacent two of the plurality of restricting portions 33 defines a first sliding slot 35. Each of the plurality of restricting portions 33 includes a first restricting plane 331, a second restricting plane 332, and a connecting plane 335 connected to the first restricting plane 331 and the second restricting plane 332. The first restricting plane 331 obliquely extends from a side edge of the first sliding slot 35 and connects a bottom edge of the connecting plane 335. The second restricting plane 332 obliquely extends from a top edge of the connecting plane 335, opposite to the bottom edge. The second restricting plane 332 obliquely extends to an adjacent first sliding slot 35 and is connected to an adjacent restricting portion 33. A first angle is defined between the first restricting plane 331 and the connecting plane 335, and the first angle is acute. A second angle is defined between the second restricting plane 332 and the connecting plane 335, and the second angle is acute. The plurality of restricting portions 33 presents a saw-tooth aspect around the lower circumference of the receiving portion 31, allowing rotation in only one direction. The receiving portion 31 defines a receiving hole 311. In one embodiment, the receiving hole 311 is round, a diameter of the receiving hole 311 is smaller than that of the head portion 211 and is larger than that of the threaded portion 213.

Figure 2:
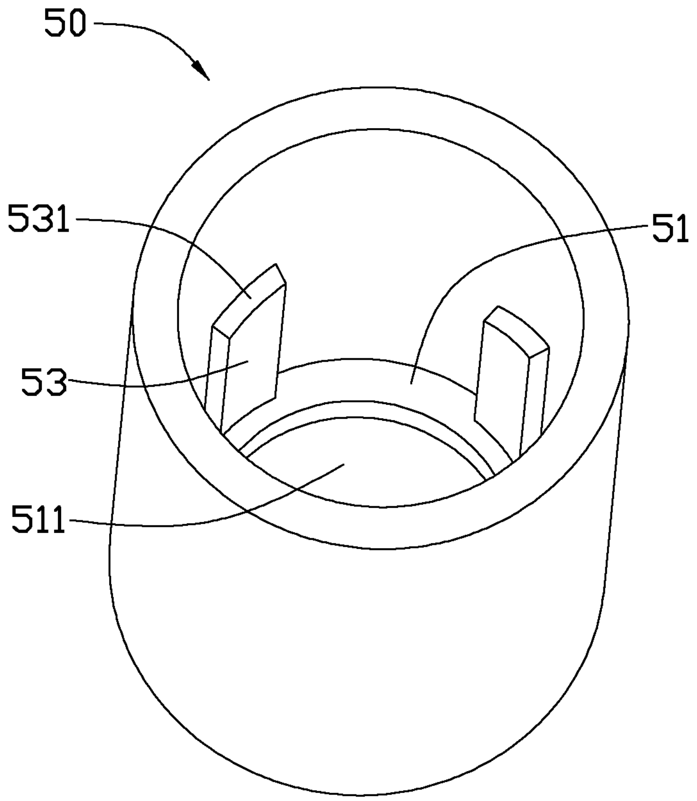
FIG. 2 is an isometric view of a blocking member of the pick-up device of FIG. 1.
Figure 3:
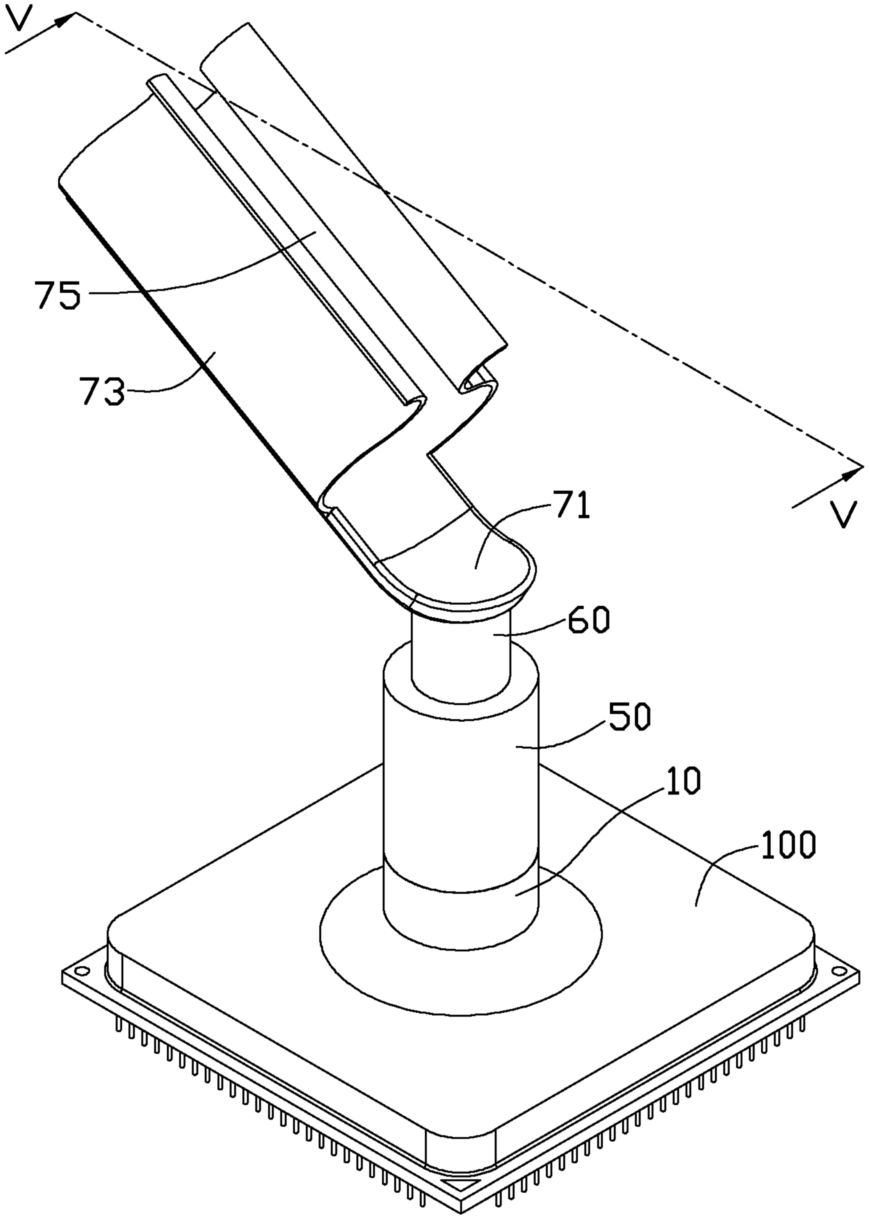
FIG. 3 is an isometric view of the assembled pick-up device and the component of FIG. 1.
Figure 4:
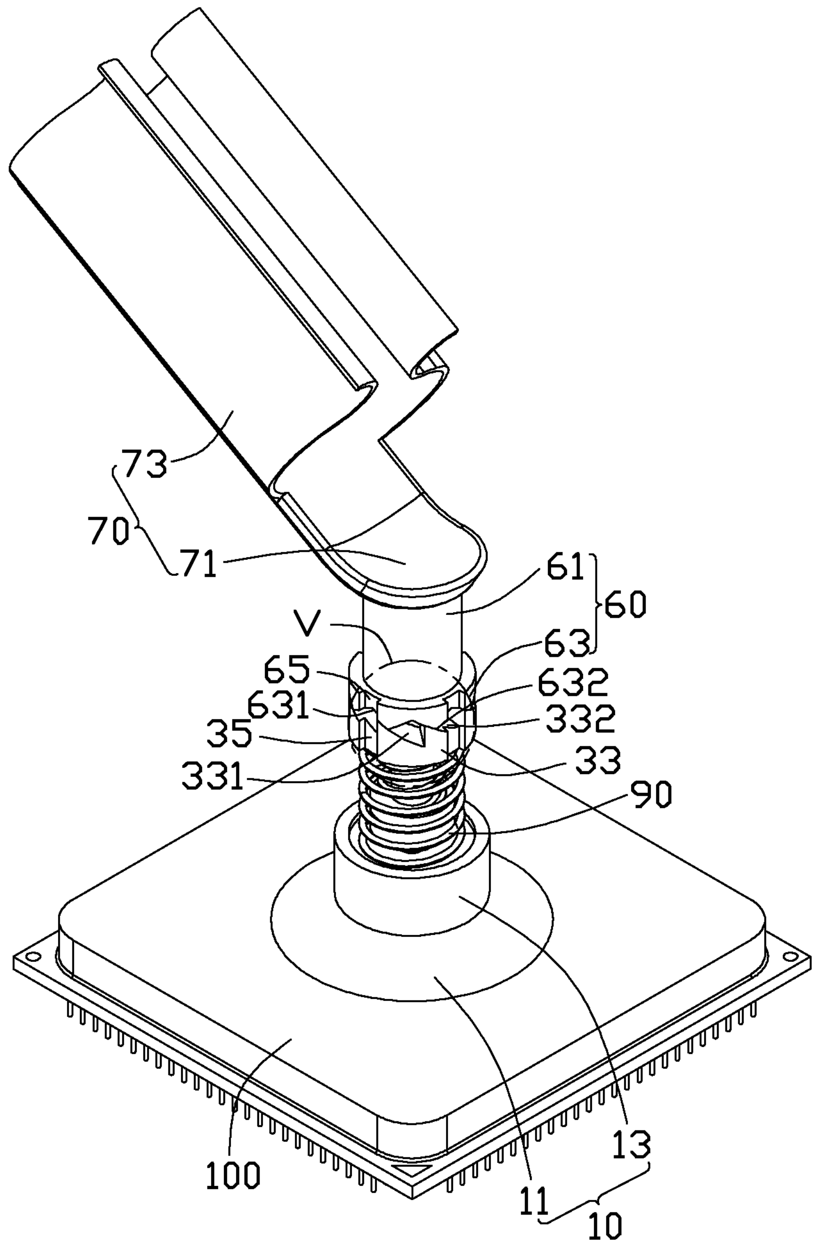
FIG. 4 is similar to FIG. 3, but the blocking member component is not shown.
Figure 5:
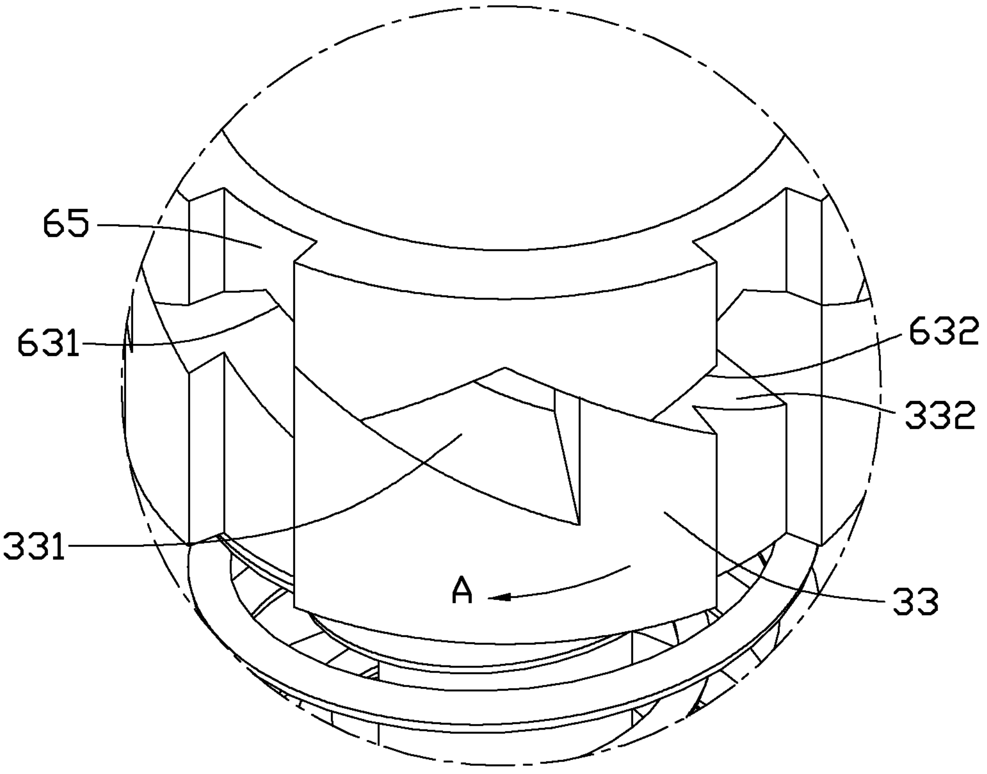
FIG. 5 is an enlarged view of a circled portion V of FIG. 4.
Figure 6:
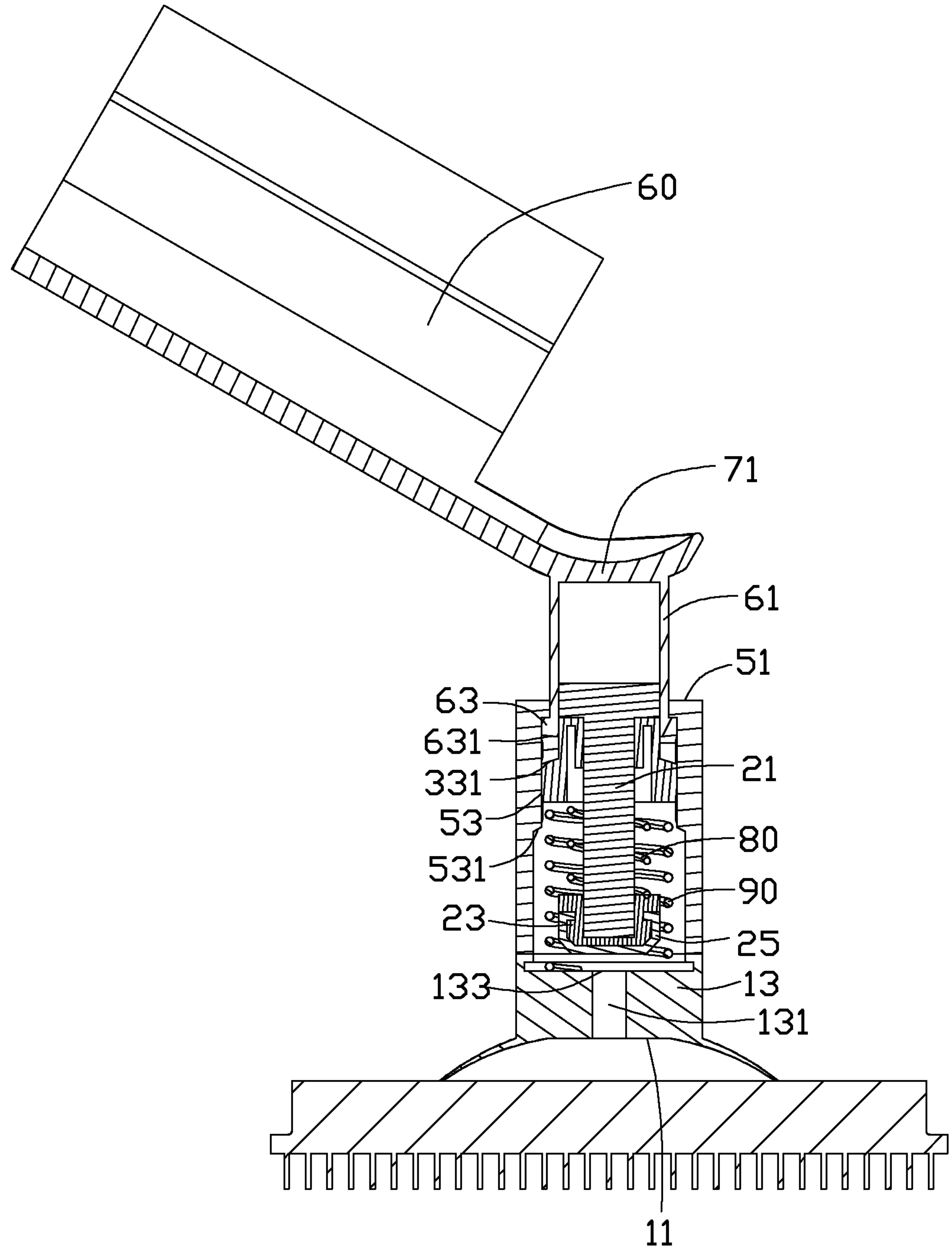
FIG. 6 is a cutaway view along a direction VI-VI of FIG. 3.

Referring to FIG. 2, the blocking member 50 includes a top wall 51. The top wall 51 defines an opening 511. In one embodiment, the blocking member 50 is cylindrical, and the opening 511 is round. A plurality of blocking blocks 53 is located on an inner surface of the blocking member 50, to act against the saw-toothed restricting portions 33. Each blocking block 53 includes a bevel blocking plane 531. An extending direction of the blocking plane 531 is substantially parallel to both that of the first restricting plane 331 and the second restricting plane 332.

The grasping assembly 200 includes an operating member 60 and a grasping member 70. The operating member 60 includes a positioning portion 61 and a plurality of driving portions 63, located on an outer surface of the positioning portion 61. The positioning portion 61 is cylindrical. A second sliding slot 65 is defined between each of every two adjacent driving portions 63. Each driving portion 63 includes a first sliding plane 631, a second sliding plane 632, a first connecting plane 633, and a second connecting plane 635. The first connecting plane is connected to the first sliding plane 631 and the second sliding plane 632. The second connecting plane 635 is connected to the second sliding plane 632. The first sliding plane 631 obliquely extends from the driving portion 63 to the second sliding slot 65. An extending direction of the first sliding plane 631 is substantially parallel to that of the first restricting plane 331 and the second restricting plane 332. A third angle is defined between the first connecting plane 633 and the first sliding plane 631, and the third angle is obtuse. A fourth angle is defined between the first connecting plane 633 and the second sliding plane 632, and the fourth angle is obtuse. An extending direction of the second sliding plane 632 is substantially parallel to that of the first sliding plane 631. The second connecting plane 635 is connected to the second sliding plane 632 and extends to an adjacent second sliding slot 65. An outer diameter of the positioning portion 61 is smaller than a diameter of the opening 511. The plurality of driving portions 63 is adapted to abut a bottom surface of the top wall 51.

The grasping member 70 includes a pressing piece 71 and two grasping pieces 73 extend from two opposite ends of the pressing piece 71. Each grasping piece 73 is substantially in the shape of an "S". A gap 75 is defined between the two grasping pieces 73. The two grasping pieces 73 are elastically deformable so as to be able to grip a finger.

Referring to FIGS. 3-6, in assembly, the installing member 21 is moved towards the restricting member 30, and the threaded portion 213 is received in the receiving hole 311. A first resilient member 80 surrounds the threaded portion 213. The threaded portion 213 is screwed into the threaded hole 233, and the locking member 23 is secured to the installing member 21. The first resilient member 80 is secured between the restricting member 30 and the locking member 23. The locking member 23 is moved to abut the covering member 25, and the installing portion 251 is thus elastically deformed. The locking member 23 is partially engaged in the positioning hole 256. The installing portion 251 responds to engage the positioning piece 255 in the latching slot 231. Thus, the restricting member 30 is secured to the covering member 25, and the restricting member 30 may slide relative to the covering assembly 20. The operating member 60 is moved toward the blocking member 50. The positioning portion 61 is inserted into and through the opening 511, and the blocking blocks 53 are received in the second sliding slots 65. The driving portions 63 are received in the blocking member 50 and abut a bottom surface of the top wall 51. The assembled restricting member 30 and the covering assembly 20 are moved towards the blocking member 50 and received in the blocking member 50. Each of the plurality of first sliding slots 35 is aligned with each of the plurality of second sliding slots 65. Each of the plurality of blocking blocks 53 is received in each of the plurality of first sliding slots 35 and each of the plurality of second sliding slots 65. A second resilient member 90 is secured between the recess portion 133 and the restricting member 30. The mounting portion 13 of the sucking member 10 is secured to the blocking member 50. Thus, the absorbing device is assembled completely. In this position, the driving portion 63 abuts the restricting portion 33. An upper part of the first restricting plane 331 abuts a bottom part of the first sliding plane 631. An upper part of the second restricting plane 332 abuts a bottom part of the second sliding plane 632. Thus, there is tendency for the operating member 60 to slide relative to the restricting member 30. The plurality of blocking blocks 53 are received in the plurality of first sliding slots 35 and the second sliding slots 65, to prevent the operating member 60 from sliding relative to the restricting member 30. A gap is defined between the covering portion 253 and the recess portion 133. The covering assembly 20 and the restricting member 30 are located in an initial position. In one embodiment, the second resilient member 90 is a spring.

Figure 7:
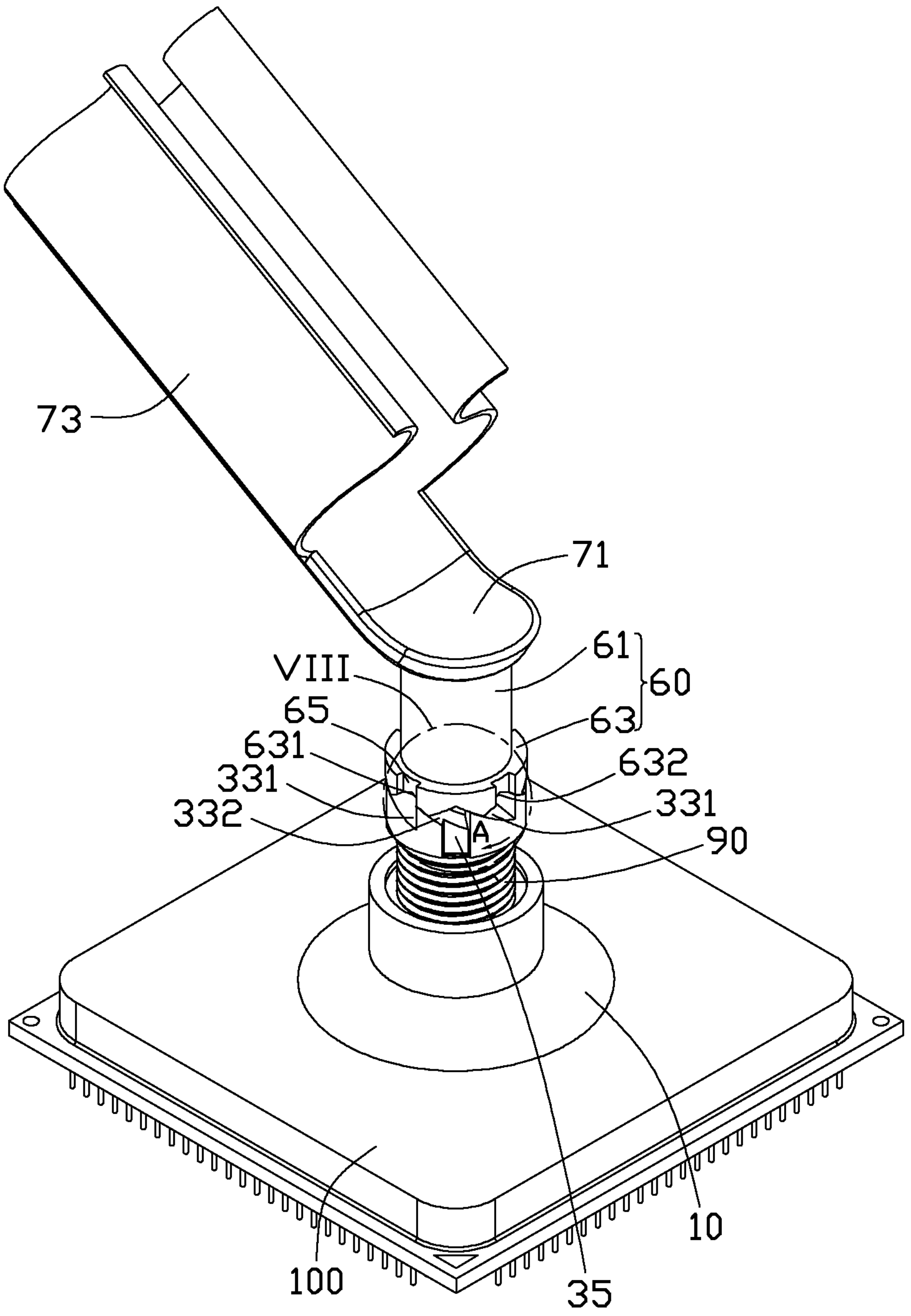
FIG. 7 is similar to FIG. 4, but shows the assembled pick-up device in a different position.
Figure 8:
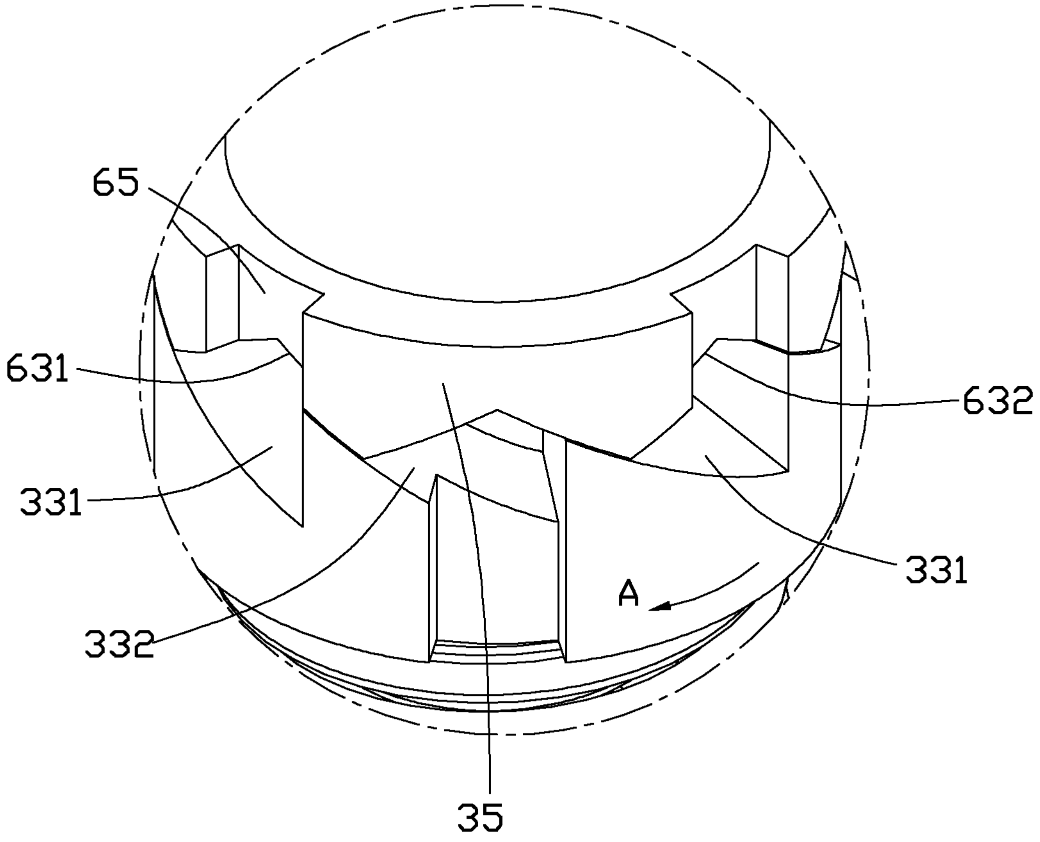
FIG. 8 is an enlarged view of a circled portion VIII of FIG. 7.
Figure 9:
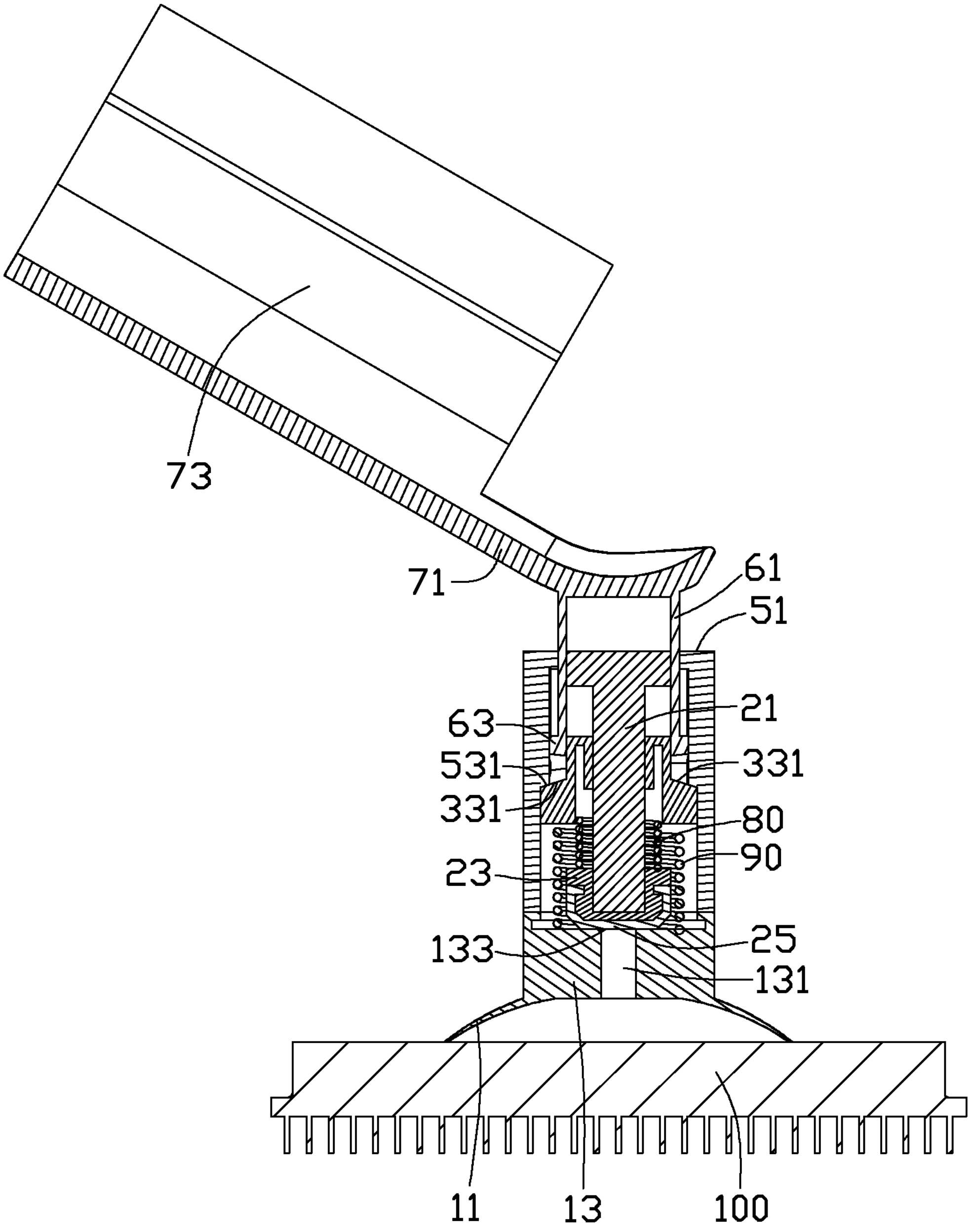
FIG. 9 is similar to FIG. 5, but the assembled pick-up device is shown in a different position.

Referring to FIGS. 7-9, in use, the suction cup 11 needs to be brought down to adhere to a top surface of the component 100. A human finger is inserted between the two grasping pieces 73, a fingertip abutting the pressing piece 71. The two grasping pieces 73 elastically deform and friction holds them on the finger. The pressing piece 71 is pressed towards the component 100. The blocking member 50 is moved towards the electronic component 100 and biases the restricting member 30 and the covering assembly 20 to move towards the component 100. The covering portion 253 abuts the recess portion 133 and seals the through hole 131. The second resilient member 90 is elastically deformed. The blocking member 50 is further moved towards the component 100. When a tip portion of the first restricting plane 331 slides over a tip portion of the blocking block 53, the blocking block 53 is disengaged from the second sliding slot 65. The first restricting plane 331 is slid along the blocking plane 531. A tip portion of the second restricting plane 332 is engaged between the second sliding plane 632 and the first connecting plane 633. The covering member 25 presses the sucking member 10, so as to exhaust air between the sucking member 10 and the component 100. The first resilient member 80 is elastically deformed and biases the covering member 25 to further seal the through hole 131. When the sucking member 10 sucks the electronic component 100, the second resilient member 90 responds and biases the restricting member 30 to lift the operating member 60. The operating member 60 is further slid along the blocking plane 531. The restricting member 30 is rotated along a direction "A" relative to the blocking member 50 until the blocking block 53 is engaged between the first restricting plane 331 and the connecting plane 335. In this position, a lower part of the second restricting plane 332 abuts a lower part of the first sliding plane 631, and an upper part of the first restricting plane 331 abuts a lower part of an adjacent second sliding plane 632. Thus, there is a tendency for the operating member 60 to slide relative to the restricting member 30. The blocking blocks 53 prevent the operating member 60 from sliding relative to the restricting member 30. The first resilient member 80 is elastically deformed and exerts elastic force to bias the sucking member 10 to increase the vacuum holding the electronic component 100 in place. In this position, the covering assembly 20 and the restricting member 30 are located in a sucking position.

The pick-up device carries the electronic component 100 to a precise position in a circuit board (not shown). The pressing piece 71 is pressed again, the blocking member 50 is further moved towards the electronic component 100 and biases the restricting member 30 and the covering assembly 20 to move towards the component 100. The first resilient member 80 and the second resilient member 90 are elastically deformed. When the tip portion of the second restricting plane 332 slides over the tip portion of the blocking block 53, the blocking block 53 is disengaged from the second restricting plane 332 and the connecting plane 335. The second restricting plane 332 slides along the blocking plane 531. The restricting member 30 is rotated along the direction "A" relative to the blocking member 50, until the blocking block 53 is engaged between the second restricting plane 332 and an adjacent restricting portion 33. In this position, the restricting member 30 is slid along the blocking plane 531 relative to the blocking member 50, until the blocking block 53 engages between the first restricting plane 331 and the connecting plane 335. The first sliding slot 35 is aligned to an adjacent second sliding slot 65. The first resilient member 80 and the second resilient member 90 respond and bias the restricting member 30, the blocking member 50 and the covering assembly 20 to return to the initial position. The covering portion 253 is disengaged from the recess portion 133. In this position, air rushes in between the suction cup 11 and the electronic component 100 via the through hole 131. The suction cup 11 thus releases the component 100.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A pick-up device comprising:

a sucking member defining a through hole;

a blocking member, comprising a blocking block, is secured to the sucking member;

a grasping assembly slidably mounted to the blocking member and adapted to grasp a finger;

a restricting member movably mounted to the grasping assembly and movable relative to the sucking member, and the restricting member comprising two restricting portions; and a covering member secured to the restricting member by a first resilient member;

wherein the grasping assembly is operable to bias the restricting member and the covering member to move relative to the sucking member; the two restricting portions are engaged with the blocking block, to prevent the restricting member from moving away from the sucking member; and the covering member seals the through hole.

2. The pick-up device of claim 1, wherein a second resilient member is secured between the restricting member and the covering member.

3. The pick-up device of claim 1, wherein the grasping assembly comprises an operating member and a grasping member, the operating member is slidably mounted to the blocking member and operable to move the restricting member, and the grasping member is adapted to grasp the finger.

4. The pick-up device of claim 3, wherein the grasping member comprises a pressing piece and two grasping pieces extend from the pressing piece, and a gap is defined between the two grasping pieces for receiving the finger.

5. The pick-up device of claim 4, wherein each of the two grasping pieces is substantially "S" shaped.

6. The pick-up device of claim 3, wherein each of the two restricting portions comprises an oblique first restricting plane, the blocking block comprises an oblique blocking plane, and the oblique first restricting plane is substantially parallel to the oblique blocking plane; and the oblique first restricting plane abuts the oblique blocking plane, to prevent the restricting member from moving away from the sucking member.

7. The pick-up device of claim 6, wherein a first sliding slot is defined between the two restricting portions, the operating member comprises two driving portions, and a second sliding slot is defined between the two driving portions; each of the two restricting portions further comprises an oblique second restricting plane, and a connecting plane is connected to the oblique first restricting plane and the oblique second restricting plane; each of the two driving portions comprises an oblique first sliding plane and an oblique second sliding plane; when the two restricting portions are engaged with the blocking block, the oblique second restricting plane abuts the oblique first sliding plane, the oblique first restricting plane abuts the oblique second sliding plane, and the blocking block is received in the second sliding slot and engaged between the oblique second restricting plane and the connecting plane.

8. The pick-up device of claim 7, wherein the oblique first restricting plane is substantially parallel to the oblique second restricting plane and the blocking plane, a first acute angle is defined between the oblique first restricting plane and the connecting plane, and a second acute angle is defined between the oblique second restricting plane and the connecting plane.

9. The pick-up device of claim 7, wherein the grasping assembly is further operable to disengage the two restricting portions from the blocking block; when the two restricting portions are disengaged from the blocking block, the oblique first restricting plane abuts the first sliding plane, the oblique second restricting plane abuts the second sliding plane, the first sliding slot is aligned with the second sliding slot; and the blocking block is received in the first sliding slot and the second sliding slot, to prevent the restricting member and the operating member from moving relative to each other.

10. The pick-up device of claim 9, wherein the first sliding plane is substantially parallel to the second sliding plane and the blocking plane.

11. A pick-up device comprising:

a sucking member defining a through hole;

a blocking member, secured to the sucking member, comprising a blocking block;

a grasping assembly slidably mounted to the blocking member and adapted to grasp a finger;

a restricting member movably mounted to the grasping assembly and movable relative to the sucking member, and the restricting member comprising two restricting portions; and a covering assembly received in the blocking member and comprising an installing member, a locking member and a covering member; the locking member is secured to the covering member, and the locking member secures the restricting member to the locking member; and a first resilient member is secured between the covering member and the restricting member;

wherein the grasping assembly is operable to bias the restricting member and the covering member to move relative to the sucking member; the two restricting portions are engaged with the blocking block, to prevent the restricting member from moving away from the sucking member; and the covering member seals the through hole.

12. The pick-up device of claim 11, wherein a second resilient member is secured between the restricting member and the sucking member.

13. The pick-up device of claim 11, wherein the grasping assembly comprises an operating member and a grasping member, the operating member is slidably mounted to the blocking member and operable to move the restricting member, and the grasping member is adapted to grasp the finger.

14. The pick-up device of claim 13, wherein the grasping member comprises a pressing piece and two grasping pieces extend from the pressing piece, and a gap is defined between the two grasping pieces for receiving the finger.

15. The pick-up device of claim 14, wherein each of the two grasping pieces is substantially "S" shaped.

16. The pick-up device of claim 13, wherein each of the two restricting portions comprises an oblique first restricting plane, the blocking block comprises an oblique blocking plane, and the oblique first restricting plane is substantially parallel to the oblique blocking plane; and the oblique first restricting plane abuts the oblique blocking plane, to prevent the restricting member from moving away from the sucking member.

17. The pick-up device of claim 16, wherein a first sliding slot is defined between the two restricting portions, the operating member comprises two driving portions, and a second sliding slot is defined between the two driving portions; each of the two restricting portions further comprises an oblique second restricting plane, and a connecting plane is connected to the oblique first restricting plane and the oblique second restricting plane; each of the two driving portions comprises an oblique first sliding plane and an oblique second sliding plane; when the two restricting portions are engaged with the blocking block, the oblique second restricting plane abuts the oblique first sliding plane, the oblique first restricting plane abuts the oblique second sliding plane, and the blocking block is received in the second sliding slot and engaged between the oblique second restricting plane and the connecting plane.

18. The pick-up device of claim 17, wherein the oblique first restricting plane is substantially parallel to the oblique second restricting plane and the blocking plane, a first acute angle is defined between the oblique first restricting plane and the connecting plane, and a second acute angle is defined between the oblique second restricting plane and the connecting plane.

19. The pick-up device of claim 17, wherein the grasping assembly is further operable to disengage the two restricting portions from the blocking block; when the two restricting portions are disengaged from the blocking block, the oblique first restricting plane abuts the first sliding plane, the oblique second restricting plane abuts the second sliding plane, the first sliding slot is aligned with the second sliding slot, and the blocking block is received in the first sliding slot and the second sliding slot, to prevent the restricting member and the operating member from moving relative to each other.

20. The pick-up device of claim 19, wherein the first sliding plane is substantially parallel to the second sliding plane and the blocking plane.

* * * * *